United States Patent
Yamauchi

(10) Patent No.: US 8,882,266 B2
(45) Date of Patent: Nov. 11, 2014

(54) BIFOCAL LENS AND BIFOCAL GLASSES

(75) Inventor: Satoshi Yamauchi, Yokohama (JP)

(73) Assignee: Oisllee Planning Co., Ltd., Kanagawa (JP)

( * ) Notice: Subject to any disclaimer, the term of this patent is extended or adjusted under 35 U.S.C. 154(b) by 65 days.

(21) Appl. No.: 13/138,441

(22) PCT Filed: Feb. 12, 2010

(86) PCT No.: PCT/JP2010/052083
§ 371 (c)(1),
(2), (4) Date: Aug. 16, 2011

(87) PCT Pub. No.: WO2010/095571
PCT Pub. Date: Aug. 26, 2010

(65) Prior Publication Data
US 2011/0299030 A1 Dec. 8, 2011

(30) Foreign Application Priority Data
Feb. 20, 2009 (JP) ................. 2009-037679

(51) Int. Cl.
G02C 7/00 (2006.01)
G02C 7/02 (2006.01)
G02C 7/06 (2006.01)
G02B 3/14 (2006.01)
G02C 7/08 (2006.01)

(52) U.S. Cl.
CPC . G02B 3/14 (2013.01); G02C 7/085 (2013.01)
USPC .................................................. 351/159.39

(58) Field of Classification Search
CPC .............. G02C 1/00; G02C 7/02; G02C 7/00; G02C 7/04; G02C 7/06; G02C 7/10; G02C 3/00; A61F 2/16; G02B 1/06; G02B 3/12
USPC ............ 359/665, 666; 623/6.17; 351/159.01, 351/159.03, 159.04, 159.05, 159.34, 351/159.39, 159.4, 159.41, 159.68, 159.73
See application file for complete search history.

(56) References Cited

U.S. PATENT DOCUMENTS 5,182,585 A * 1/1993 Stoner ............................. 351/41
5,440,357 A * 8/1995 Quaglia ........................ 351/158
(Continued)

FOREIGN PATENT DOCUMENTS

JP 4-323613 11/1992
JP 9-230252 9/1997
(Continued)

*Primary Examiner* — James Greece
(74) *Attorney, Agent, or Firm* — Jordan and Hamburg LLP

(57) ABSTRACT

Disclosed is a bifocal lens constructed such that the lens is not easily damaged when hit by flying fragments and, moreover, able to obtain a consistent focal length with a simple construction. The lens is equipped with a transparent substrate having transparency and rigidity, a transparent resilient body having transparency and elasticity, a transparent fluid enclosed in the space between the aforementioned transparent substrate and the aforementioned transparent resilient body, and a mechanism that induces changes in the shape of the aforementioned transparent resilient body. Changes are induced in the shape of the transparent resilient body to form the desired shape in the two states of the lens which comprises the transparent fluid enclosed in the space between the transparent substrate and the transparent resilient body, making it possible to obtain the desired characteristics (accurate optical characteristics) in either of the two states.

11 Claims, 9 Drawing Sheets

(56) References Cited

U.S. PATENT DOCUMENTS

| | | | |
|---|---|---|---|
| 5,712,721 A * | 1/1998 | Large | 359/245 |
| 5,917,657 A | 6/1999 | Kaneko et al. | |
| 6,280,471 B1 * | 8/2001 | Peyman et al. | 623/6.17 |
| 7,453,646 B2 * | 11/2008 | Lo | 359/665 |
| 7,675,686 B2 * | 3/2010 | Lo et al. | 359/665 |
| 7,826,145 B2 * | 11/2010 | Justis et al. | 359/666 |
| 8,018,658 B2 * | 9/2011 | Lo | 359/665 |
| 2007/0211207 A1 * | 9/2007 | Lo et al. | 351/41 |
| 2010/0039709 A1 * | 2/2010 | Lo | 359/665 |

FOREIGN PATENT DOCUMENTS

| | | |
|---|---|---|
| JP | 11-002701 | 1/1999 |
| JP | 2001-249202 | 9/2001 |
| JP | 2002-243918 | 8/2002 |
| JP | 2003-014909 | 1/2003 |
| JP | 2006-072267 | 3/2006 |
| JP | 2006-106488 | 4/2006 |
| JP | 2009-168971 | 7/2009 |

\* cited by examiner

FIG. 1
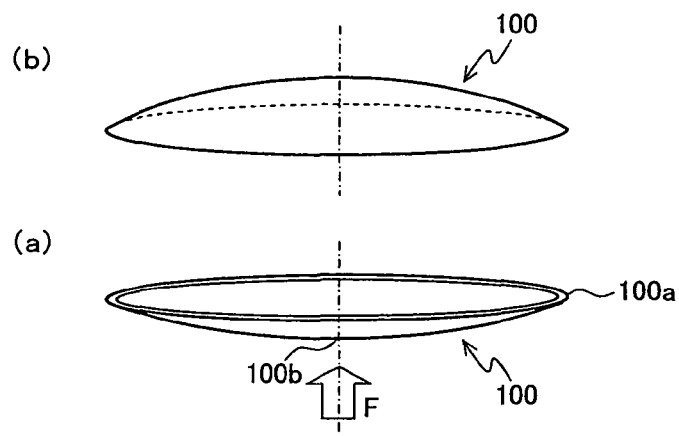
FIG. 2
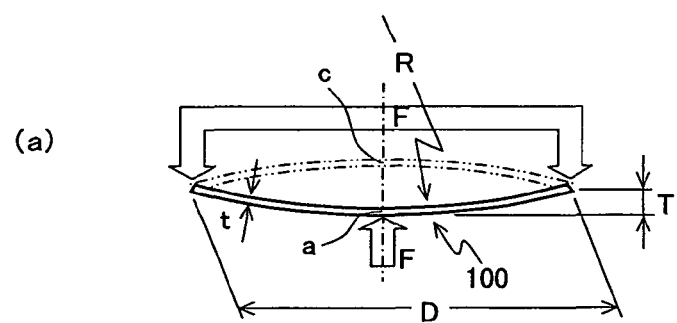
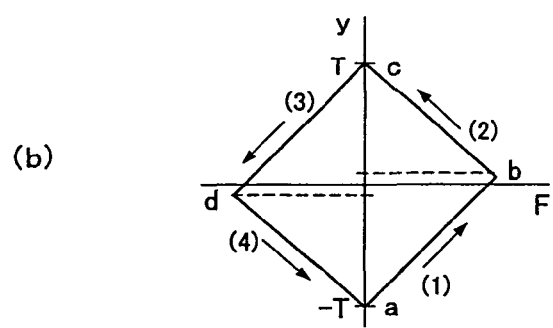

FIG. 5
(a)
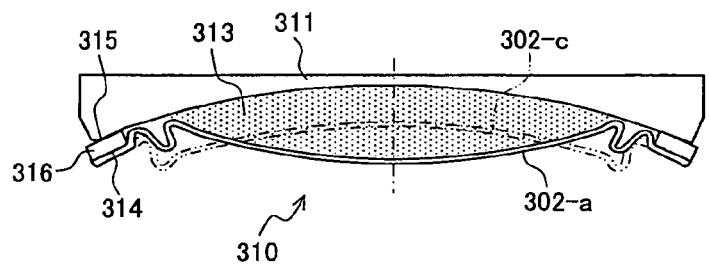
(b)
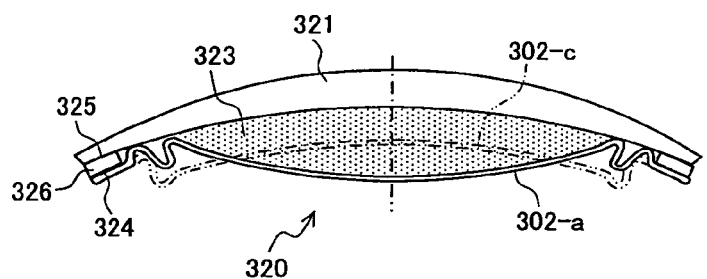
(c)
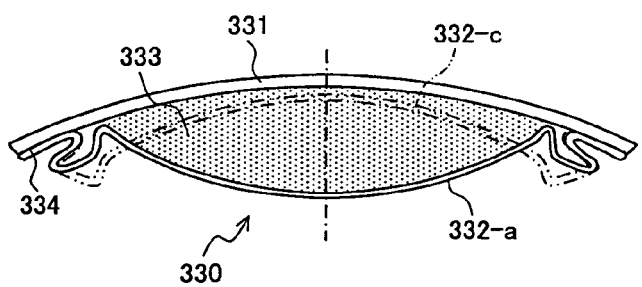
(d)
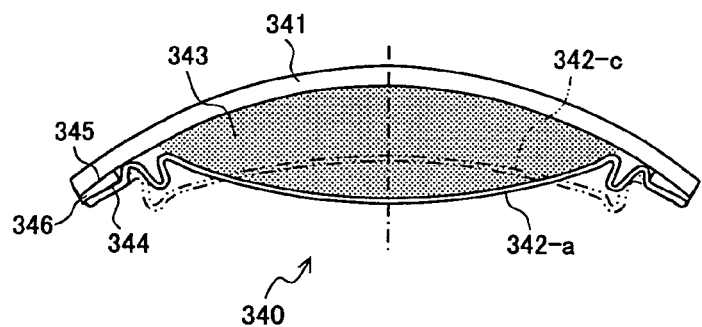

FIG. 9
(a)
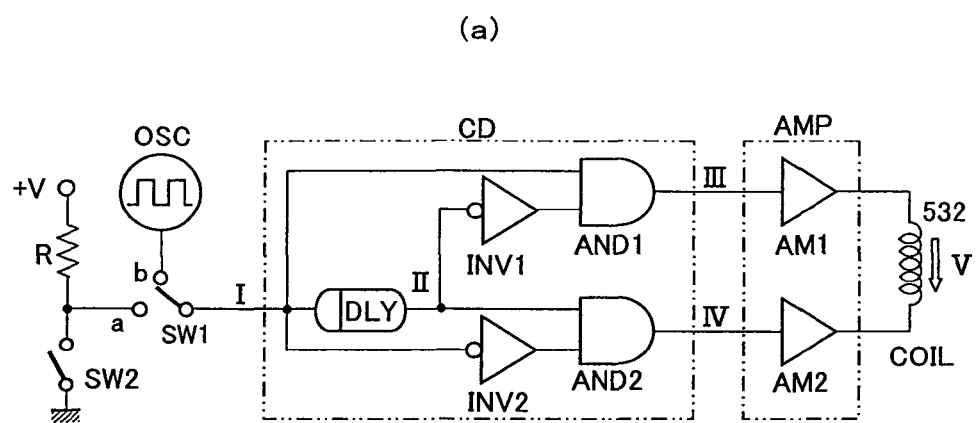
(b)
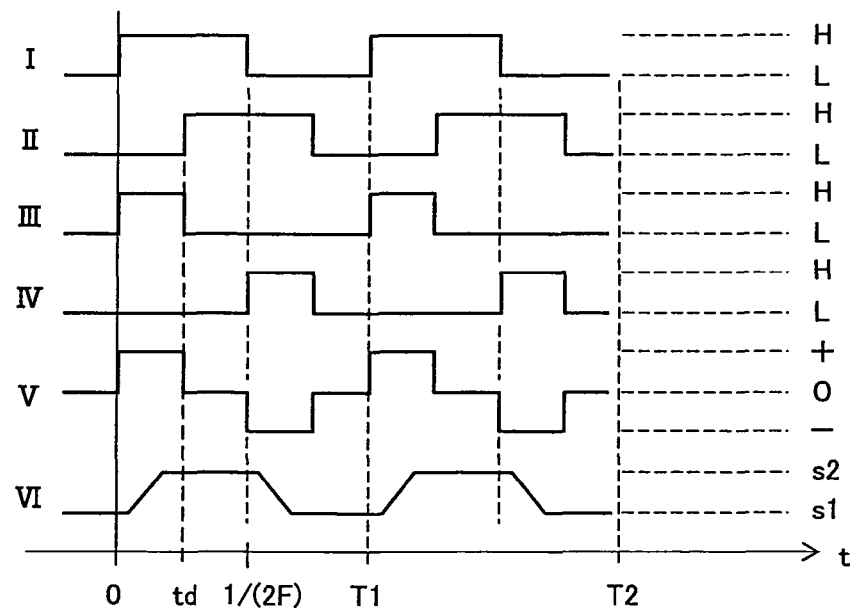

BIFOCAL LENS AND BIFOCAL GLASSES

TECHNICAL FIELD

The present invention relates to a bifocal lens capable of varying its focal length and bifocal glasses provided with the same lens, and, to a bifocal lens applied suitably e.g., to glasses for elderly persons having a reduced focus-adjusting ability in the sense of sight and to magnifying glasses used when performing a delicate work at hand, and to bifocal glasses provided with the bifocal lens.

BACKGROUND ART

In case of a reduction of focus-adjusting ability in the sense of sight, there have conventionally been used glasses 10 as depicted in FIG. 11 having a lens 11 for ordinary life and a lens 12 for seeing something nearby e.g., when reading a book or sewing, integrated into a single lens such that one of the two lenses is used depending on the angle of the line of sight of eyes so that an object can clearly be seen.

In other words, the user moves his/her eyeballs for use while being conscious of the upper side and the lower side so that an object of several meters or more in size or a scene is seen through the lens having its optical axis on the upper side and so that an object of the order of several tens of centimeters is seen through the lens having its optical axis on the lower side.

The user, however, needs to use the glasses while being conscious of, at all times, which lens of the upper and lower ones is being used. Further, in a case where careful attention is needed to peripheral objects while seeing an object at the center when doing a work nearby using the lower lens, the user has to follow the objects while turning his/her head since the angle of field is narrow. This results in a drawback that the user gets tired soon.

As a method for overcoming the drawback there has hitherto been proposed a variable-focus lens capable of adjusting its focal length depending on the distance to a target object. Proposed are ones (see, e.g., Patent Documents 1 and 2) having two transparent soft-elastic bodies with a transparent liquid or a gel-like substance confined therebetween so that the focal length is varied by changing the volume of the liquid or the gel-like substance; and one (see, e.g., Patent Document 3) having a transparent gel-like substance formed as a solid lens at one side and confined by a transparent soft-elastic film at the other side so that the focal length is varied by a deformation of the soft-elastic film.

It may be difficult, however, for the configuration of Patent Document 1 or 2 to obtain lens characteristics (accurate lens characteristics) as designed since the transparent soft-elastic bodies function as a lens under pressure. Further, in case of using as glasses, due to two faces made of the soft-elastic bodies, they may possibly often be deformed or damaged when touched by a finger or when hit by a flying fragment. It is thus necessary to cover at least one face in contact with the external world with a protective hood made of glass or plastic. Though Patent Document 3 solves the latter problem, difficulties still remain in control of the lens shape of the soft-elastic body and in acquisition of desired lens characteristics.

PRIOR ART DOCUMENT

Patent Documents

Patent Document 1: Japanese Laid-Open Patent Publication No. 2001-249202

Patent Document 2: Japanese Laid-Open Patent Publication No. 2003-14909

Patent Document 3: Japanese Laid-Open Patent Publication No. 2006-106488

SUMMARY OF THE INVENTION

First is to provide a structure hard to be damaged even if hit by an external flying fragment and second is to obtain a bifocal lens having a simple structure and a consistent focal length.

The invention relates to a bifocal lens comprising: a transparent substrate having a transparency and a rigidity; a transparent rigid-elastic body having a transparency and an elasticity; a transparent fluid confined to an area between the transparent substrate and the transparent rigid-elastic body; and a control mechanism inducing a change in the shape of the transparent elastic body wherein the transparent elastic body is a transparent rigid-elastic body combining a rigidity on a having a portion shaped concave or convex, the control mechanism is a drive mechanism for changing the portion from convex shape to concave shape or vice versa.

The bifocal lens comprises: a transparent substrate having a transparency and a rigidity; a transparent rigid-elastic body having a transparency and an elasticity; a transparent fluid confined to an area between the transparent substrate and the transparent rigid-elastic body; and a control mechanism periodically changing the shape of the transparent rigid-elastic body, wherein the transparent elastic body is a transparent rigid-elastic body combining a rigidity on a having a portion shaped concave or convex, the control mechanism is a drive mechanism for periodically changing the portion from convex shape to concave shape or vice versa alternately.

The invention includes bifocal glasses comprising a bifocal lens.

According to the invention, a change of the form of a transparent rigid-elastic body is induced so as to impart predetermined shapes to two different forms of a lens made up of a transparent fluid confined between a transparent substrate and the transparent rigid-elastic body, thereby enabling desired characteristics (accurate optical characteristics) to be obtained for both of the two forms.

According to the invention, in a lens made up of the transparent fluid confined between the transparent substrate and the transparent rigid-elastic body, desired characteristics (accurate optical characteristics) can be obtained for both of two different lens forms acquired by periodically changing the form of the transparent rigid-elastic body.

According to the invention, a bifocal lens is used to form glasses, as a result of which there can be obtained bifocal glasses allowing the user to use them without feeling any fatigue even when the user follows and looks hard at objects lying at different positions by virtue of use of the lens having a wider angle of field and accurate lens characteristics.

BRIEF DESCRIPTION OF DRAWINGS

FIGS. 1(a) and 1(b) are diagrams for explaining a principle of operation of a transparent rigid-elastic body that is one of constituent elements of the present invention.

FIG. 2(a) is a transverse cross-sectional view through a central portion of a plate-like disc of FIG. 1; and FIG. 2(b) is a conceptual diagram of a vertical displacement of the central portion when a force F is being applied.

FIGS. 5(a) to 5(d) depict examples enabling various focal length combinations by imparting a lens effect to a transparent substrate or by differentiating the curvatures of the transparent substrate and of the transparent elastic body.

FIGS. 9(a) and 9(b) depict, by way of example, a device for driving a drive coil.

DESCRIPTION OF THE PREFERRED EMBODIMENTS

Figure 3:
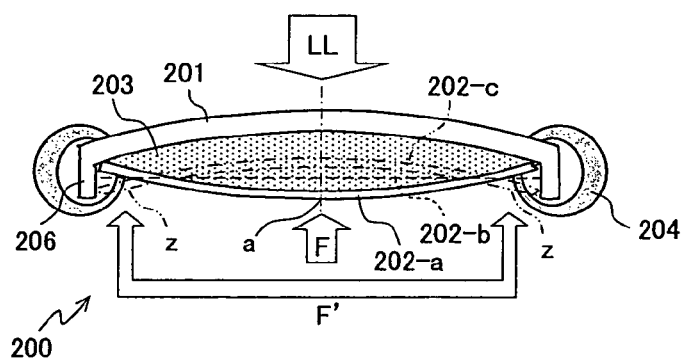
FIG. 3 is an explanatory diagram of a basic way of thinking of a bifocal lens configured by use of a transparent elastic body among rigid-elastic bodies.

<Explanation of Operation Principle of Elastic Rigid Body>

An embodiment of the present invention will now be described with reference to the drawings.

FIGS. 1(a) and 1(b) are diagrams for explaining a principle of operation of a transparent rigid-elastic body that is one of constituent elements of the present invention. In FIG. 1, reference numeral 100 denotes a disc made of a rigid elastic body. The disc 100 of the rigid elastic body is a plate-like disc having a diameter D and a thickness t that is obtained by cutting out a spherical part of a radius R (meanings of signs used herein will hereinafter be described). The rigid elastic body has a rigidity but also has an elasticity. Though not transparent, steel is common and it is well known that the steel is used as a leaf spring (by contrast, a flexible elastic body represented by rubber is referred to as a soft elastic body). A common glass falls as a transparent elastic body under the rigid-elastic body as long as it is used so as not to exceed its elastic limit. For use in the present invention, however, commonly-called plastics are convenient. Among them, polyvinyl chloride (PVC), polyethylene terephthalate (PET), U-polymer (trademark of UNITIKA Ltd.), etc., are preferred. First, as depicted in FIG. 1(a), the plate-like disc 100 is placed in a downwardly convex manner with its rim 100a being secured, after which the plate is thrust up from under at a center 100b by a force F as indicated by an arrow so that the plate-like disc 100 rises while being gradually bent. When rising up to a certain level, it is inverted into an upwardly convex manner as depicted in FIG. 1(b). Once inverted, its shape remains unchanged even though the force F is removed. From this state, the force F is applied in the opposite direction (from above) until the plate lowers a certain distance to recover its original state of FIG. 1(a).

Referring then to FIGS. 2(a) and 2(b), the above status will be described in more detail. FIG. 2(a) is a transverse cross-sectional view through a central portion of the plate-like disc 100 depicted in FIG. 1(a); and FIG. 2(b) is a conceptual diagram of a vertical displacement of the central portion when a force F is being applied. The contour of the plate indicated by a solid line is a shape that is obtained by cutting out part of a hollow spherical body with a radius R, the plate-like disc having a diameter D, a bulge T at the center relative to the peripheries, and a thickness t. Depicted is a case where the plate-like disc 100 indicated by the solid line is placed in a downwardly convex manner with its peripheral portions being pressed down from above, with its central portion being thrust up from below (the forces applied from both above and below are denoted by F: Note that the mass of the plate-like disc is negligible). The contour of the plate indicated by a dashed double-dotted line is a transverse cross section through the central portion of the plate-like disc in the state of FIG. 1(b). FIG. 2(b) depicts, as a conception, a relationship between the force F being applied and a vertical displacement y at the central portion. That is, the horizontal axis of the coordinates represents the force F applied and the vertical axis thereof represents the displacement y at the central portion of the plate-like disc.

Initially, the plate-like disc is free with no force F applied (F=0) and its central portion lies at point 'a' which is a position −T (y=−T) on the y-axis. When the force F is applied thereto as depicted in FIG. 2(a), the central portion transitions as indicated by (1) of FIG. 2(b). Namely, up to a position level with the rim, the central portion rises in proportion to the force F, and, when reaches point 'b' slightly (of the order of the thickness of the disc) exceeding the rim position, it rises sharply up to point 'c' while describing track (2), for stability. Within the region of track (2), the central portion transitions by only the internal stress of the plate-like disc without any external force. The stabilized state after the transition is the state of a downwardly facing plate (the shape of FIG. 1(b)) indicated by the dashed double-dotted line that is opposite to the upwardly facing plate state in the initial state depicted in FIG. 2(a).

At this time, the plate-like disc is free with no force F applied (F=0) similarly to the initial state. The central portion in this state lies at point 'c', and, when a negative force F is being applied to the central portion, it descends down to a position level with the rim in proportion to the force F while describing track (3). Instantly reaching point 'd' slightly (of the order of the thickness of the disc) exceeding the rim position, the central portion sharply descends down to point 'a' while describing track (4) to restore its original state for stability. Similarly to the operation within the region of track (2), the central portion transitions within the region of track (4) by only the internal stress of the plate-like disc without any external force.

In this manner, this elastic body in the form of the plate-like disc has two stable shapes (upwardly concave plate shape and downwardly concave plate shape, both having a curvature of R).

<Explanation of Operation Principle in Case of Application to Bifocal Lens>

FIG. 3 is an explanatory diagram of a basic way of thinking of a bifocal lens configured by using, a transparent elastic body out of rigid-elastic bodies (hereinafter, referred to simply as elastic body) shown in the above operation principle.

A bifocal lens 200 is fabricated by preparing a plate-like disc transparent substrate 201 having a transparency and a rigidity and a plate-like disc transparent elastic body 202 having a transparency and a rigid elasticity; causing their convex surfaces to confront each other, with their rims coinciding with each other without leaving any spaces; and injecting and confining a transparent liquid into a space therebetween so that a lens function is produced. The rims of the transparent substrate 201 and of the transparent elastic body 202 are sealed up by a soft-elastic body 204 having an elasticity like rubber and having a generally annular shape with an English alphabetic C-shaped section like tires of automobiles and bicycles.

The configuration of the bifocal lens 200 will be described in more detail.

The transparent substrate 201 is made of a transparent resin (acrylics, polycarbonate, etc.) or of a transparent glass (which may be colored for use as sunglasses). Its thickness is of the order of 1 mm or more which is relatively thick (any thickness may be employed unless deformation occurs when a positive pressure or a negative pressure is applied to the liquid 203) so as to keep its rigidity. Although this may be used singly as a lens, the thickness is constant in the following description to facilitate the description of the essence of the present invention. The shape is a plate-like disc with its principal portion (portion as a lens transmitting light) having a uniform thickness, with its inner portion having a curvature of R, and with its rim having a cylindrical protrusion 206 for preventing the liquid 203 from leaking out of the gap between the substrate 201 and the transparent elastic body 202. In case of using polycarbonate (PC) as a specific material, its light refractive index is 1.585, and when using BK7 that is an optical glass, its light refractive index is 1.518.

The transparent elastic body 202 is also made of a transparent resin and is much thinner than the transparent substrate 201 (The thickness is preferably of the order of 0.1 mm for acrylics, polycarbonate, etc., but it may be 0.2 mm or more when using a material such as PET or transparent vinyl chloride. Since this thickness is not absolute but is determined depending on the diameter D, it may be larger or smaller than the values shown hereinabove as long as the characteristics described in FIGS. 1 and 2 are obtained). The transparent elastic body 202 is a plate-like disc having a uniform thickness and a curvature of R equal to that of the transparent substrate 201. In case of using polycarbonate (PC) and acrylics, their light refractive indexes are 1.585 and 1.49, respectively, and, when using polyethylene terephthalate (PET), its light refractive index is of the order of 1.575.

The liquid 203 is a transparent liquid (which may be one with a high liquidity or oil-like one with a high viscosity, such as water, alcohol, spindle oil, and cedar oil, as long as the substance moves under pressure), and it may be colorless or colored if it transmits light in some degree. The light refractive index is 1.333 when using water, 1.362 in use of ethyl alcohol, and 1.516 in use of cedar oil.

The elastic body 204 is an elastic body that is soft like rubber and that has a generally annular shape with an English alphabetic C-shaped section like tires of automobiles and bicycles. The transparent substrate 201 and the transparent elastic body 202 are clamped between opposed ends of the C-shape under a constant force so that the positional relationship between the transparent substrate 201 and the transparent elastic body 202 becomes stable in either case where the transparent elastic body 202 is in the convex state (indicated by a solid line in FIG. 4(c)) or in the concave state (indicated by a dashed double-dotted line in FIG. 4(c)).

In the state (state 1), as depicted in FIG. 3, where the transparent elastic body 202 is downwardly convex as indicated by a solid line 202-a, a double-convex lens having a curvature of R is formed by the three elements, i.e., the transparent substrate 201, the transparent elastic body 202, and the transparent liquid 203 confined therebetween. Then, the focal length f of the convex lens is $f=R/(2\times(n-1))$ where n is refractive index of the liquid 203.

Next, in the state (state 2) where the transparent elastic body 202 is upwardly convex as indicated by a dashed double-dotted line 202-c, the gap between the transparent substrate 201 and the transparent elastic body 202 is unvarying at all portions on the entire surface so that three layers of the transparent substrate 201, the transparent liquid 203, and the transparent elastic body 202 integrally make up a transparent body with a certain thickness and a curvature R, as a result of which no lens effect occurs (that is, the focal length f at that time is infinite $\infty$). In other words, parallel light coming from a direction LL in FIG. 3 passes through the transparent substrate 201, the transparent elastic body 202, and the liquid 203 and leaves intactly as parallel light.

If cedar oil is used as the transparent liquid 203 and the optical glass BK7 is used as the transparent substrate 201, then no substantial reflection will appear at the boundary surface therebetween since their light refractive indexes are the order of 1.5 and rarely different from each other. Use of the polycarbonate (PC) and acrylics as the transparent substrate 201 also suppresses the reflection so as to be extremely little. Polycarbonate (PC) or polyethylene terephthalate (PET) having a higher modulus of elasticity is available as the transparent elastic body 202, however the reflection at the interface is extremely little because their light refractive indexes are in the order of 1.5 or a little bit more. It is possible to make a lens having a high light transmission ratio by forming a light reflection prevention film on the interface, even when a substance such as water or ethyl alcohol which has a light refractive index much different from the light refractive indexes of the transparent substrate 201 and of the transparent elastic body 202 is used as the transparent liquid 203.

The operation (method of causing the state to transition from the state 1 to the state 2 or of causing the state to transition from the state 2 to the state 1) of the thus constructed bifocal lens will be similarly described referring to FIG. 3.

Here, a force to cause a change in state is applied to the center and the periphery of the transparent elastic body 202. In the description, the transparent substrate 201 is fixed as depicted in FIG. 3 and a force F is applied to the center of the transparent elastic body 202 in order to cause a change from the state 1 to the state 2, and the transparent substrate 201 is fixed just the same and a force F' is applied to a peripheral portion z (ring shape) of the transparent elastic body 202 as shown in the diagram in order to cause a change from the state 2 to the state 1. At this time, forces are neglected that the elastic body 204 exerts on the transparent substrate 201 and on the transparent elastic body 202.

First, the initial state 202-a of the transparent elastic body 202 is a state where the transparent elastic body 202 is free and is subjected to no force F (F=0 and F'=0) (state 1). In this state, a convex lens is formed. From this state, when the transparent substrate 201 is fixed and a force F is applied continuously to a central portion 'a' of the transparent elastic body 202 from below in the diagram, the transparent elastic body 202 changes to a substantially central position 202-b indicated by a broken line (the transparent elastic body 202 at this time is in a substantially flat plate state), and once exceeds slightly the position 202-b, the transparent elastic body 202 abruptly turns into a state 202-c. That is, the central portion thereof rises up to the level of the rim in proportion to the force F, and once exceeds slightly (of the order of the disc thickness) the rim position, the transparent elastic body 202 turns to the state 202-c (downwardly facing plate state indicated by the dashed double-dotted line that is opposite to the upwardly facing plate state in the initial state) by only an internal stress of the plate-like disc without applying any external force (state 2). No lens effect arises at that time.

Next, the plate-like disc is in a state similar to the initial state where it is free and is not subjected to any force F (F=0 and F'=0). When a force F' is applied continuously to the peripheral portion z of the transparent elastic body 202 in this state, the transparent elastic body 202 changes to the position 202-b indicated by the broken line (the transparent elastic body 202 at this time is in a substantially flat plate state), and once exceeds slightly the position, the transparent elastic body 202 turns abruptly to the state 202-a. That is, the peripheral portion z rises up to the level of the central portion in proportion to the force F', and once exceeds slightly (of the order of the disc thickness) the position of the central portion, the transparent elastic body 202 returns to the state 202-a (the upwardly facing plate state in the initial state (state 1)) by only an internal stress of the plate-like disc without applying any external force (state 2). A convex lens is formed at that time.

Figure 4:
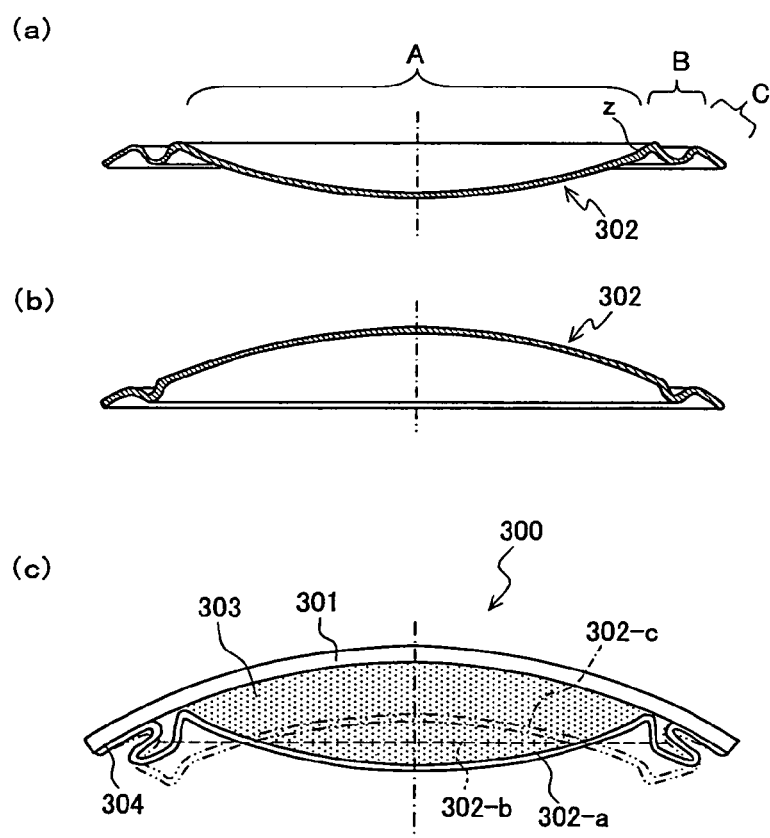
FIGS. 4(a) to 4(c) are cross sections at the center of the transparent elastic body taking measures to cope with a liquid leak at the periphery.

Although the basic way of thinking is realized without change in the above embodiment, a high-accuracy assembling work is required at the points of contact at the peripheral portion between the transparent substrate and the transparent elastic body so as to prevent any leak of the transparent liquid. In changing the shape of the transparent elastic body between concave and convex repeatedly, the transparent liquid may possibly leak out as a result of abrasion. Thus, depicted in FIG. 4 is an embodiment in which the peripheral portion is hermetically sealed so as not to bring about any liquid leak irrespective of a long time use.

FIGS. 4(a) and 4(b) depict a transparent elastic body 302 coping with a liquid leak at the peripheral portion and are cross-sectional views through the center of the transparent elastic body 302. FIG. 4(a) is a diagram depicting the downwardly convex state, with a region A corresponding to 202 of FIG. 3. A region C is a portion securely adhered (bonded, fusion-welded, or clamped) to the transparent substrate though the region C will hereinafter be described in detail. A region B is a cushioning portion for providing a relief when an expansion force acts from the central portion toward the peripheral portion z in the process of the change of the plate-shaped region A from the convex state to the concave state and concave state to the convex state and for facilitating the movement of the peripheral portion z of the region A. The corrugated shape may otherwise be various shapes depending on the purposes. FIG. 4(b) depicts a shape in the case where the same of FIG. 4(a) is in its upwardly convex state. Although the regions A, B, and C are integrally formed herein, the region B may slightly be thinner than the region A to vary the rigidity, or the region A may be made of different members from the regions B and C, more specifically, the region A may be made of a rigid-elastic body and the regions B and C may be made of a soft-elastic body so that the purposes can be achieved more easily.

FIG. 4(c) is a conceptual diagram depicting a configuration in which, in place of the transparent elastic body of the bifocal lens of FIG. 3, the transparent elastic body described in FIGS. 4(a) and 4(b) is securely adhered to the transparent substrate so as to prevent a leak of the transparent liquid, with the replacing transparent elastic body being designated at 302.

Reference numeral 301 denotes a transparent substrate corresponding to 201 of FIG. 3, reference numeral 303 denotes a transparent liquid corresponding to 203 of FIG. 3, and the transparent elastic body 302 corresponds to 202 of FIG. 3. In the region A, 302-a, 302-b, and 303-c are depicted corresponding to 202-a, 202-b, and 202-c, respectively. To ensure the free motion of the peripheral portion z of the region A, the region B has an S-shaped section more winding than the corrugated shape depicted in FIGS. 4(a) and 4(b). The region C of the transparent elastic body 302 is securely adhered at a surface 304 to the peripheral portion of the transparent substrate 301. In this manner, the transparent substrate 301 and the transparent elastic body 302 are hermetically sealed, with the result that the liquid 303 injected in the interior is prevented from leaking.

This bifocal lens 300 performs the same action as the action described in FIG. 3 and can replace the bifocal lens 200 of FIG. 3. As a result, when the transparent elastic body 302 is in the state 302-a, the lens acts as a convex lens, whereas when the transparent elastic body 302 is in the state 302-c, no lens effect appears, and parallel light penetrate as it is.

<Transparent Liquid and Displacement of Transparent Elastic Body Peripheral Portion Z>

The displacement of the peripheral portion z is found when applying a force F or F' causing a change in the state of the transparent elastic body of the bifocal lens as described above (assuming that it is a double-convex lens, the displacement is approximately equal to the thickness of one half of the lens).

It is shown herein together with major sizes of the lens when the transparent liquid used herein is water, ethyl alcohol, cedar oil, α-bromonaphthalene, and diiodomethane.

TABLE 1

|  | water | | ethyl alcohol | | cedar oil | | α-bromonaphthalene | | diiodomethane | |
| --- | --- | --- | --- | --- | --- | --- | --- | --- | --- | --- |
| n = | 1.333 | 1.333 | 1.3618 | 1.3618 | 1.516 | 1.516 | 1.66 | 1.66 | 1.737 | 1.737 |
| f = | 200 | 250 | 200 | 250 | 200 | 250 | 200 | 250 | 200 | 250 |
| R = | 133.2 | 166.5 | 144.7 | 180.9 | 206.4 | 258.0 | 264.0 | 330.0 | 294.8 | 368.5 |
| D1 = | 50 | 50 | 50 | 50 | 50 | 50 | 50 | 50 | 50 | 50 |
| T1 = | 2.367 | 1.888 | 2.176 | 1.736 | 1.520 | 1.214 | 1.186 | 0.948 | 1.062 | 0.849 |
| D2 = | 42 | 42 | 42 | 42 | 42 | 42 | 42 | 42 | 42 | 42 |
| T2 = | 1.666 | 1.330 | 1.532 | 1.223 | 1.071 | 0.856 | 0.837 | 0.669 | 0.749 | 0.599 | where
n = light refractive index
f = desired focal length (unit: mm)
R = radius of curvature of lens when it is double-convex
D1 = lens effective diameter - Example 1 (unit: mm)
T1 = lens thickness (one half) when lens effective diameter is D1 (unit: mm)
D2 = lens effective diameter - Example 2 (unit: mm)
T2 = lens thickness (one half) when lens effective diameter is D2 (unit: mm)

As can be seen from this, in case of cedar oil that is relatively easy to handle, when the focal length is 200 mm with the lens diameter of 42 mm, the lens net thickness is of the order of 2.14 mm, and the amount to displace by applying a force is of the order of 1.07 mm. Use of liquid having a large refractive index enables the displacement to be reduced.

<Variations of Bifocal Lens>

Although the embodiment has hereinabove been described in which using the transparent substrate with no lens effect and with a curvature equal to that of the transparent elastic body, two states are switched, one is the state 1 that is a convex lens state and the other is the state 2 that has no lens function (the focal length is infinite), various combinations of the focal lengths become feasible by imparting the lens effect to the transparent substrate or by causing the curvature of the transparent substrate to differ from that of the transparent elastic body. Some of the variations are depicted in FIG. 5.

A bifocal lens 310 depicted in FIG. 5(a) is an example having the same shapes except the transparent substrate of the bifocal lens 300 of FIG. 4(c) and using a transparent substrate 311 in the shape of a concave lens (note that the region C (see FIG. 4(a)) of the transparent elastic body 302 is securely adhered via a spacer ring 314 to the transparent substrate 311). By employing this configuration, a bifocal lens is obtained that has a positive focal length (i.e., a convex lens forms) in the state 1 and that has a negative focal length (i.e., a concave lens forms) in the state 2.

Similarly, a bifocal lens 320 of FIG. 5(b) is an example using a convex lens 321 as the transparent substrate of the bifocal lens 300 of FIG. 4(c). By employing this configuration, a bifocal lens is obtained that has a positive focal length (i.e., a convex lens forms) in the state 1 and that has a positive focal length (i.e., a convex lens with different focal lengths forms) in the state 2 as well.

FIGS. 5(c) and 5(d) are examples in which a transparent substrate 331 has a constant thickness similarly to the bifocal lens of FIG. 4(c) but in which a spherical radius R1 of the transparent substrate is not equal to a spherical radius R2 of the transparent elastic body.

A bifocal lens 330 of FIG. 5(c) is an example of R1>R2 in which a bifocal lens is obtained that has a positive focal length (i.e., a convex lens forms) in the state 1 and that has a negative focal length (i.e., a concave lens forms) in the state 2.

A bifocal lens 340 of FIG. 5(d) is an example of R1<R2 in which a bifocal lens is obtained that has a positive focal length (i.e., a convex lens forms) in the state 1 and that has a positive focal length (i.e., a convex lens with different focal lengths forms) in the state 2 as well.

The four examples described above are not exclusive as combinations of means for imparting a lens function to the transparent substrate and means for making the radius R1 of the transparent substrate and the radius R2 of the transparent elastic body different from each other. That is, by making the radius R1 of the transparent substrate and the radius R2 of the transparent elastic body different from each other in FIGS. 5(a) and 5(b), different focal lengths can be obtained in the states 1 and the state 2. Alternatively, the transparent substrate may be formed as a convex lens or concave lens in FIGS. 5(c) and 5(d) so as to allow the focal lengths in the state 1 and the state 2 to differ from each other.

<Structure to Change Focal Length>

Although in case of using as a separate lens the forces F and F' may be applied by hand to change the two states (states 1 and 2) of the bifocal lens depicted in FIGS. 3, 4(c), and 5, individual manual applications of the forces will be inconvenient when the lens is mounted to a portion of any device such as glasses. A method of applying a force through electrical control will thus be described.

Figure 6:
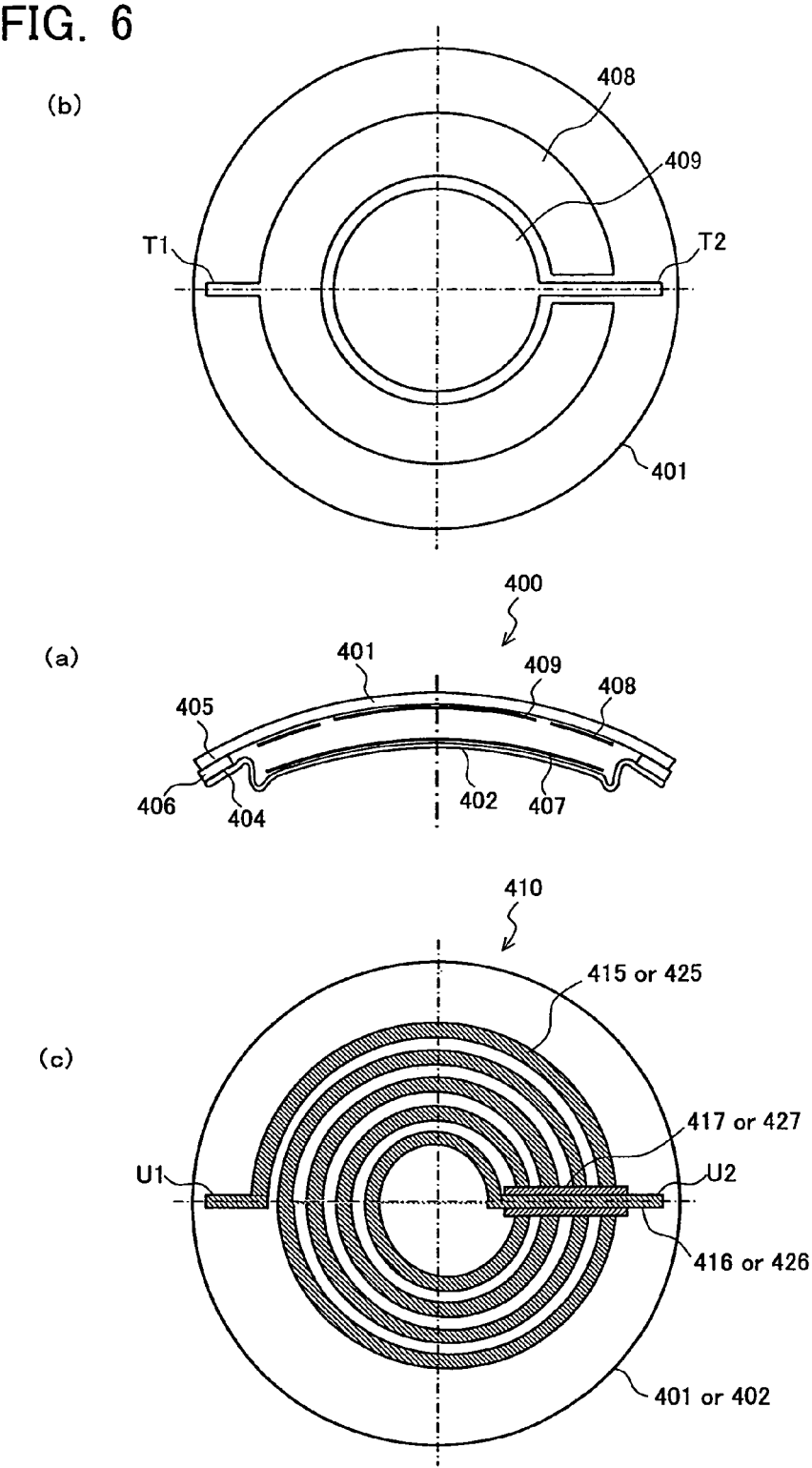
FIGS. 6(a) to 6(c) are diagrams explaining a specific example for changing the transparent elastic body.

Referring to FIGS. 6(a) and 6(b), electrodes are added to the transparent substrate and the transparent elastic body of the lens having the same structure as that of FIG. 4(c), with electric charges being applied to the electrodes so that Coulomb force gives rise to the force F or F'. FIG. 6(a) is a cross-sectional view seen from the same direction as in FIG. 4(c), depicting a transparent elastic body 402 in only the state 2 indicated by the dashed double-dotted line of FIG. 4(c). A transparent substrate 401 and the transparent elastic body 402 are securely adhered at their respective surfaces 405 and 404 to each other by way of a spacer 406.

Furthermore, an ITO thin film is formed as a transparent electrode 407 on the entire surface of the transparent elastic body 402 facing the transparent substrate 401, while an ITO pattern is formed as transparent electrodes 408 and 409 on the side of the transparent substrate 401 facing the transparent elastic body 402. The transparent electrode 408 is formed on the peripheral portion and the transparent electrode 409 is formed circularly on the central portion, the electrodes 408 and 409 being insulated from each other. The electrodes 408 and 409 are formed with their respective terminals T1 and T2. When applying, with such a configuration, a minus potential to the transparent electrode 407, a plus potential to the transparent electrode 408, and a minus potential to the transparent electrode 409, a repulsion acts on the central portion due to the minus-to-minus electric charges whereas an attraction acts on the peripheral portion due to the minus-to-plus electric charges, thereby generating a force equivalent to a force of F'. Conversely, when applying a minus potential to the transparent electrode 408 and a plus potential to the transparent electrode 409 with the transparent electrode 407 still remaining at the minus potential, the central portion is subjected to an attraction (F) due to the minus-to-plus electric charges whereas the peripheral portion is subjected to a repulsion due to the minus-to-minus electric charges, thereby generating a force equivalent to a force of –F'.

As another embodiment of driving method using the electrical control, a method will be described of generating an attraction or a repulsion by applying an electro magnetic induction field. FIG. 6(c) depicts a state where a coil 415 of a transparent conductor is formed on the side of the transparent substrate 401 facing the transparent elastic body 402. Reference numeral 416 is an outgoing line made of a transparent conductor extending from the innermost end of the coil 415 to the outside. Reference numeral 417 denotes a transparent film for electrically insulating the intersection between the outgoing line 416 and the coil 415. The configuration is made in this manner to form electrodes U1 and U2 at the ends of the coil so that when current flows from the electrode U1 to the electrode U2, a magnetic field maximized at the center is generated in a direction normal to the plane of paper. In the same manner, a coil 425 identical in shape to the coil 415 is formed on the side of the transparent elastic body 402 facing the transparent substrate 401. An outgoing line 426 and an insulating film 427 correspond respectively to the outgoing line 416 and the insulating film 417. If current is fed so as to generate an in-phase magnetic field on the pair of coils, an attraction F maximized at the center arises, whereas if current is fed so as to generate an opposite-phase magnetic field, a repulsion –F maximized at the center arises (the configuration as depicted in FIG. 4(c) also generates the same attraction F and repulsion –F as long as are formed the coil 415 on the transparent substrate 301 and the coil 425 on the transparent elastic body 302).

Furthermore, the two methods may be effected at the same time to generate more forces.

For example, on the transparent elastic body 302 of FIG. 4(c) is formed the electrode 407 in the shape of the coil 425, while on the transparent substrate 301 are formed the electrode 408 remaining unchanged in shape and the electrode 409 in the shape of the coil 415 (the region to be shaped like the coil 415 is a region occupied by the electrode 409). Potentials are applied to the electrodes so that an attraction arises if plus-to-minus potentials and that a repulsion arises if plus-to-plus or minus-to-minus potentials. If plus and minus potentials are applied respectively to the electrode 407 shaped like the coil and to the electrode 409 shaped like the coil while simultaneously current is fed to the coils to generate an in-phase magnetic field, then an attraction takes place so as to be added to reinforce the attraction F. Conversely, if plus-to-plus or minus-to-minus potentials are applied while simultaneously current is fed to the coils to generate an opposite-phase magnetic field, then a repulsion takes place so as to be added to reinforce the repulsion −F.

Figure 7:
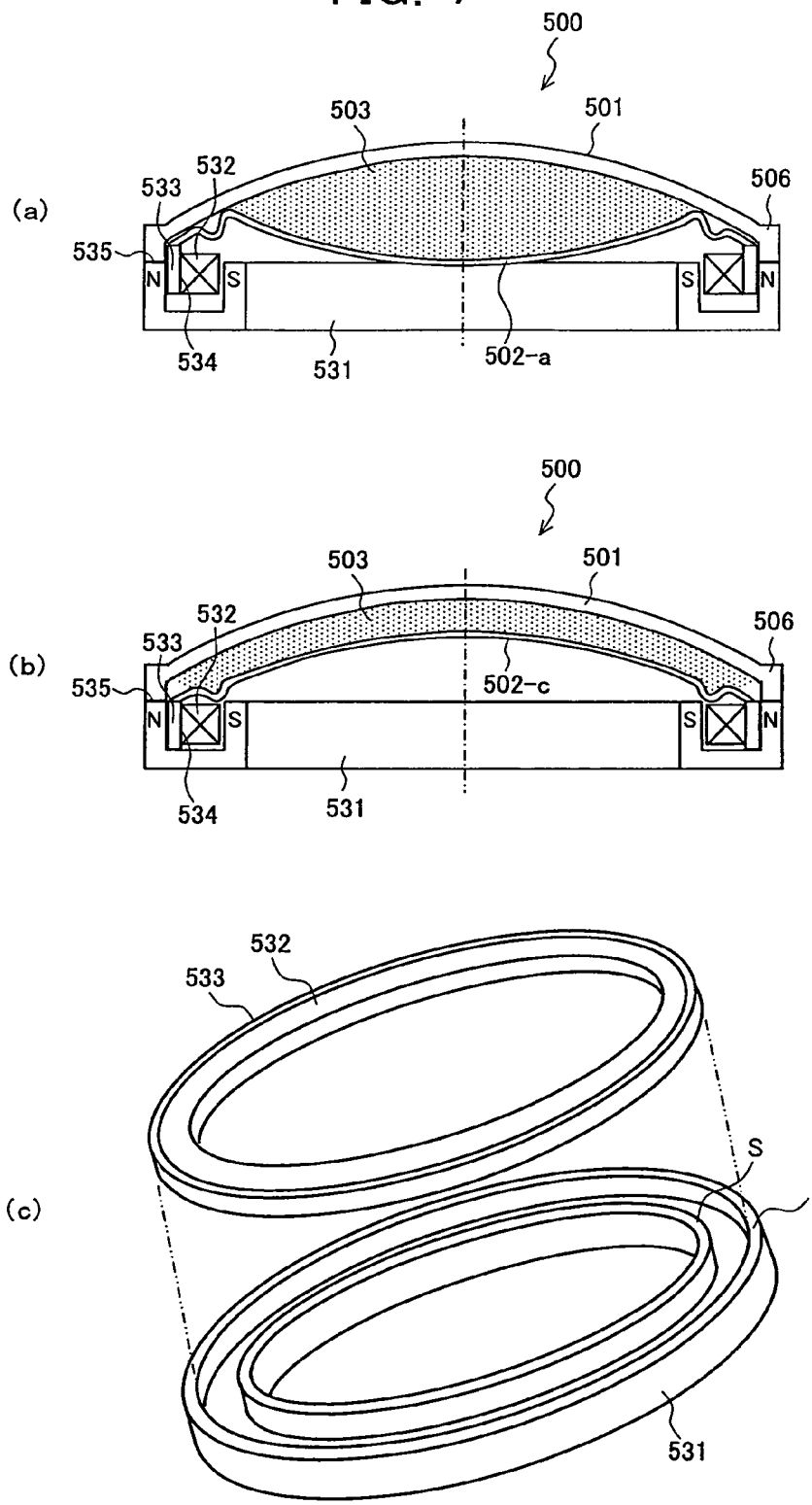
FIGS. 7(a) to 7(c) are diagrams depicting an example in which the transparent elastic body is firmly secured at its peripheral portion C to a slider.

Another embodiment electromotively inducing the forces F and F' is then depicted in FIG. 7. This is a method (called a moving coil type) in which a ring-shaped electric coil (drive coil) is securely adhered to the peripheral portion of the transparent elastic body depicted in FIG. 4, which is placed in a certain magnetic field with electric current being fed, to thereby apply an external force thereto.

In the method of FIGS. 7(a), 7(b), and 7(c), the peripheral portion in the region C of the transparent elastic body is securely adhered to a newly disposed slider instead of secure adhesion to the transparent substrate so that the slider is subjected to a force F'.

Reference numeral 501 denotes a transparent substrate corresponding to 201 of FIG. 3, reference numeral 503 denotes a transparent liquid corresponding to 203 of FIG. 3, reference numeral 502 denotes a transparent elastic body corresponding to 202 of FIG. 3, and reference numerals 502-a and 502-c are also depicted corresponding to 202-a and 202-c, respectively. Reference numeral 506 denotes a protrusion corresponding to 206 of FIG. 4. Reference numeral 533 denotes a slider securely adhered to the peripheral portion C of the transparent elastic body 502. Reference numeral 532 denotes an electrically-driven drive coil that is securely adhered via the slider 533 and a slider 534. Reference numeral 531 denotes a permanent magnet having a U-shaped section and a generally ring-like shape. The magnet 531 is magnetized so that the extremities of the U shape act as the N-pole and the S-pole, respectively, with the slider 533 and the drive coil 532 being fitted in the inside of the U shape. Configuration is such that the outer edge of the U shape confronts the protrusion 506 of the transparent substrate 501, with its confronting surface 535 being integrally securely adhered to the protrusion. Its integrated inner periphery allows the slider 533 to slides therealong.

FIG. 7(a) depicts a state where the transparent elastic body 502 is in the state 1, with the drive coil 532 slightly extending beyond the extremities of the U shape of the permanent magnet 531. FIG. 7(b) depicts a state where the transparent elastic body 502 is in the state 2, with the drive coil being fully received within the recess of the U shape of the permanent magnet 531. It is natural that the volume of the transparent liquid 502 remains unchanged from FIG. 7(a). FIG. 7(c) depicts, in a perspective view, only the relationship among the permanent magnet 531, the drive coil 532, and the slider 533.

When a positive current is fed to the coil 532 in such a configuration, a force F' can be applied to the peripheral portion C of the transparent elastic body 502, causing a change from the state 1 to the state 2. When a negative current is fed, a force −F' is applied to the peripheral portion C, causing a change from the state 2 to the state 1.

In case of the configuration depicted in FIGS. 7(a) and 7(b), after the repeated use, the degree of hermetical sealing may be impaired and the liquid may leak out. Thus, FIG. 8(a) depicts an example of obtaining a bifocal lens 560 through the electromagnetic coil driving described above with the sealing structure as depicted in FIG. 4(c). Referring to FIG. 8(a), the regions A and B of the transparent elastic body depicted in FIG. 4 are separated from each other, with a rib protruding from the peripheral portion z of the portion A, the rib being fitted with the drive coil so as to generate a driving force F'. Describing in detail, a rib 512 with an L-shaped section is formed as an extension of the region A on the peripheral portion of the transparent elastic body 502, and a portion corresponding to the region B is formed from a rigid elastic body 504 that is made of a material different from that of the region A and that is a ring with an S-shaped section, and the both are securely adhered at a portion 508. Since the peripheral portion (the region C of FIG. 4) of the rigid-elastic body 504 is clamped by the transparent substrate 501 and the spacer 507 and therefore is completely sealed up by the transparent substrate 501, the transparent rigid body 502, and the rib 512 so as to prevent the transparent liquid 503 from leaking out to the exterior. A drive coil identical to the drive coil 532 depicted in the bifocal lens 500 is adhered to the rib 512. The structure of the permanent magnet of the driving portion is the same as in the bifocal lens 500 (however, end faces of the two poles differ).

FIG. 8(a) is a single representation of the states depicted separately in FIGS. 7(a) and 7(b). That is, the state of action of the transparent elastic body as a result of the supply of current to the drive coil is quite the same as in the case of the bifocal lens 500, and the state 1 is a state 502-a where the section is hatched and the state 2 is a state 502-c indicated by a dashed double-dotted line.

FIG. 8(b) depicts a case where the rigid-elastic body is replaced by a rubber-like soft-elastic body in the region B for the same purpose. The peripheral portion of the transparent elastic body 502 is formed as a rib 522 so as to clamp a soft-elastic body 514 between the rib and a hold-down ring 523 of L shape in section, the soft-elastic body 514 being securely adhered at portions 508 and 509. Since the peripheral portion (the region C of FIG. 4) of the rigid-elastic body 514 is clamped by the transparent substrate 501 and the spacer 507 and therefore is completely sealed up by the transparent substrate 501, the transparent rigid body 502, and the rigid-elastic body 504 so as to prevent the transparent liquid 503 from leaking out to the exterior. The drive coil 532 is adhered to the L-shaped ring 523. FIG. 8(b) is also a single representation of the states depicted separately in FIGS. 7(a) and 7(b).

When a positive current is fed to the coil 532 in such a configuration, a force F' can be applied to the peripheral portion of the region A of the transparent elastic body 502, causing a change from the state 1 to the state 2. When a negative current is fed, a force −F' is applied to the peripheral portion of the region A of the transparent elastic body 502, causing a change from the state 2 to the state 1.

Figure 8:
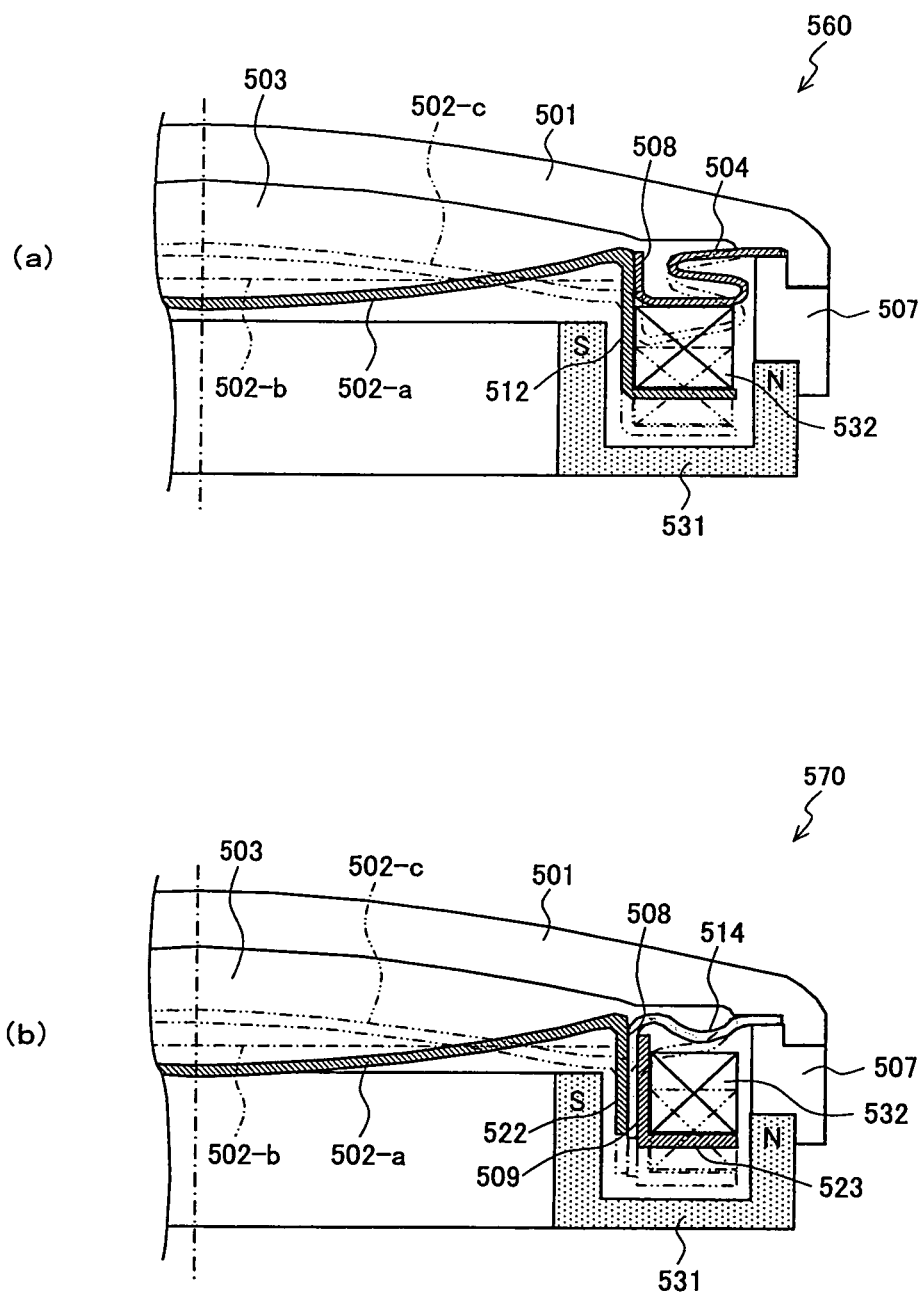
FIGS. 8(a) and 8(b) depict an embodiment in which a force is electromotively imparted to the transparent elastic body.

Although in FIGS. 7 and 8 the electromagnetic coil is securely adhered to the edge of the transparent elastic body and current to the electromagnetic coil is turned on and off within the magnetic field of the permanent magnet, conversely a force F' may be applied to the peripheral portion of the transparent elastic body by adhering a permanent magnet or a ring of soft steel (α-iron) to the edge of the transparent elastic body, replacing the U-shaped permanent magnet with an electromagnet, and applying and interrupting current blow to the electromagnet.

<Coil Driving Embodiment>

A method of switching the state between the state 1 and the state 2 by the electrical control will then be described more specifically using a moving coil type.

FIG. 9 depicts an example of a device for driving the drive coil 532. FIG. 9(a), SW1 denotes a switch for changing over the mode between automatic and manual, the switch SW1 selecting either a signal (manual) from a switch SW2 or a signal (automatic) from an oscillator OSC. A potential change detector CD includes a delay unit DLY for delaying a change in potential of an input I by a certain time (td), two inverters INV1 and INV2, and two AND gates AND1 and AND2. An output III outputs a pulse of time duration td when the input I changes from low (L) to high (H), whereas an output IV outputs a pulse of time duration td when the input I changes from high (H) to low (L). AMP denotes an amplifier for driving the drive coil COIL (532), and since an output stage of amplifier is made up of complementary FETs no current flows through the coil COIL when the amplifiers AM1 and AM2 are both low (L) or high (H), a positive current flows through COIL when AM1 is high (H) but AM2 is low (L), and a negative current flows through COIL when AM1 is low (L) but AM2 is high (h). SW2 denotes a switch that imparts a change signal to the input I by hand. The switch SW2 gives rise to a change from low (L) to high (H) when turned off from on and a change from high (H) to low (L) when turned on from off. The oscillator OSC is an oscillator that generates a rectangular wave with a frequency F to automatically repeatedly impart a change signal to the input I.

FIG. 9(b) is a timing chart depicting waveforms at terminals corresponding to Roman numerals shown in FIG. 9(a). V denotes a waveform of current flowing through the drive coil COIL (532), and VI denotes a position (therefore, a change in the focal length of the compound lens) of the transparent rigid-elastic body 502, and denotes a position of s1 denotes the state 1 and a position of s2 denotes the state 2.

An automatic mode will first be described. Although when the change-over switch SW1 lies at a position b as depicted in FIG. 9(a), a signal from the rectangular oscillator OSC is fed to the input I of the detector CD, the subsequent actions will be described referring to the timing chart of FIG. 7(b). The oscillation waveform of the oscillator OSC is a rectangular wave that alternates between high (H) and low (L) at a given cycle T=1/F as in I. The delay unit DLY delays the waveform of I by a delay time td as in II. The AND gate AND1 takes the logical AND of a waveform at I with a waveform obtained by inverting the waveform at II by the inverter INV1, output of which goes high (H) as in III during the delay time td from a rise at I to a rise at II. The AND gate AND2 takes the logical AND of a waveform at II with a waveform obtained by inverting the waveform at I by the inverter INV2, of which output goes high (H) as in IV during the delay time td from a fall at I to a fall at II. The respective outputs are delivered to the amplifiers AM1 and AM2 so that current is fed with a waveform shown at V to the coil COIL (drive coil 532). That is, when III is high (H), the amplifier AMP1 goes high (H) with the amplifier AM2 remaining low (L) to feed a positive current (in the direction indicated by an arrow) to the coil COIL, whereas when IV is high (H), the amplifier AMP2 goes high (H) with the amplifier AMP 1 being already low (L) to feed a negative current (in the direction opposite to the arrow) to the coil COIL.

In the bifocal lens 500 (560, 570) of FIG. 7 (FIG. 8), when current is fed in the direction of arrow to the drive coil (COIL) at that time, the transparent elastic body is drawn into the interior of the U-shaped section of the magnet 531, with the result that the transparent elastic body changes from the state (a) through the state (b) to the state (c), allowing a change from the state 1 (the state of a convex lens: focal length f1) to the state 2 (the state of no lens effect: focal length f2). In this case, the delay time td is preferably set so as to exceed the time required for the transparent elastic body to pass through the state (b) from the state (a).

When current is fed in this state to the drive coil 532 (COIL) in the direction opposite to the arrow, the transparent elastic body is thrust out of the interior of the U-shaped section of the magnet 531, so that the transparent elastic body changes from the state (c) through the state (b) to the state (c), allowing a change from the state 2 (the state of no lens effect: focal length f2) to the state 1 (the state of a convex lens: focal length f1). In this case, the delay time td is preferably set so as to exceed the time required for the transparent elastic body to pass through the state (b) from the state (c).

In this manner, the bifocal lens 500 (560, 570) can repeat the state of a convex lens and the state of no lens effect at a cycle T=1/F, so that if a user with farsightedness or presbyopia uses the glasses mounted with this lens, a distant scene is clearly image-formed on the user's retina for the duration of no lens effect state though it is dim for the duration of the convex lens state, whereas a nearby object is clearly image-formed thereon for the duration of the convex lens state though it is dim for the duration of the no lens effect state. This enables the user to clearly see a nearby object even if the user sees the object immediately after seeing a distant scene without performing any operations halfway, and, conversely, to clearly see a distant scene even if the user sees the scene immediately after observing a nearby object.

When the change-over switch SW1 is then turned to the point a for manual operation, an on-to-off operation of the switch SW2 causes a pulse of duration time td to be output from the output III of the detector CD only for that moment, while an off-to-on operation of the switch SW2 causes a pulse of during time td to be output from the output IV of the detector CD only for that moment. The subsequent actions are the same as the case of the automatic operation described above, and hence the detail description thereof will be omitted.

In this manner, the bifocal lens 500 (560, 570) is able to obtain the convex lens state and the no lens effect state by hand, thereby providing a lens having a proper focal length depending on an object to be observed.

<Embodiment of Bifocal Glasses>

Use of two of the bifocal lenses as set forth hereinabove enables the construction of eyeglasses and loupe for far vision and near vision.

Figure 10:
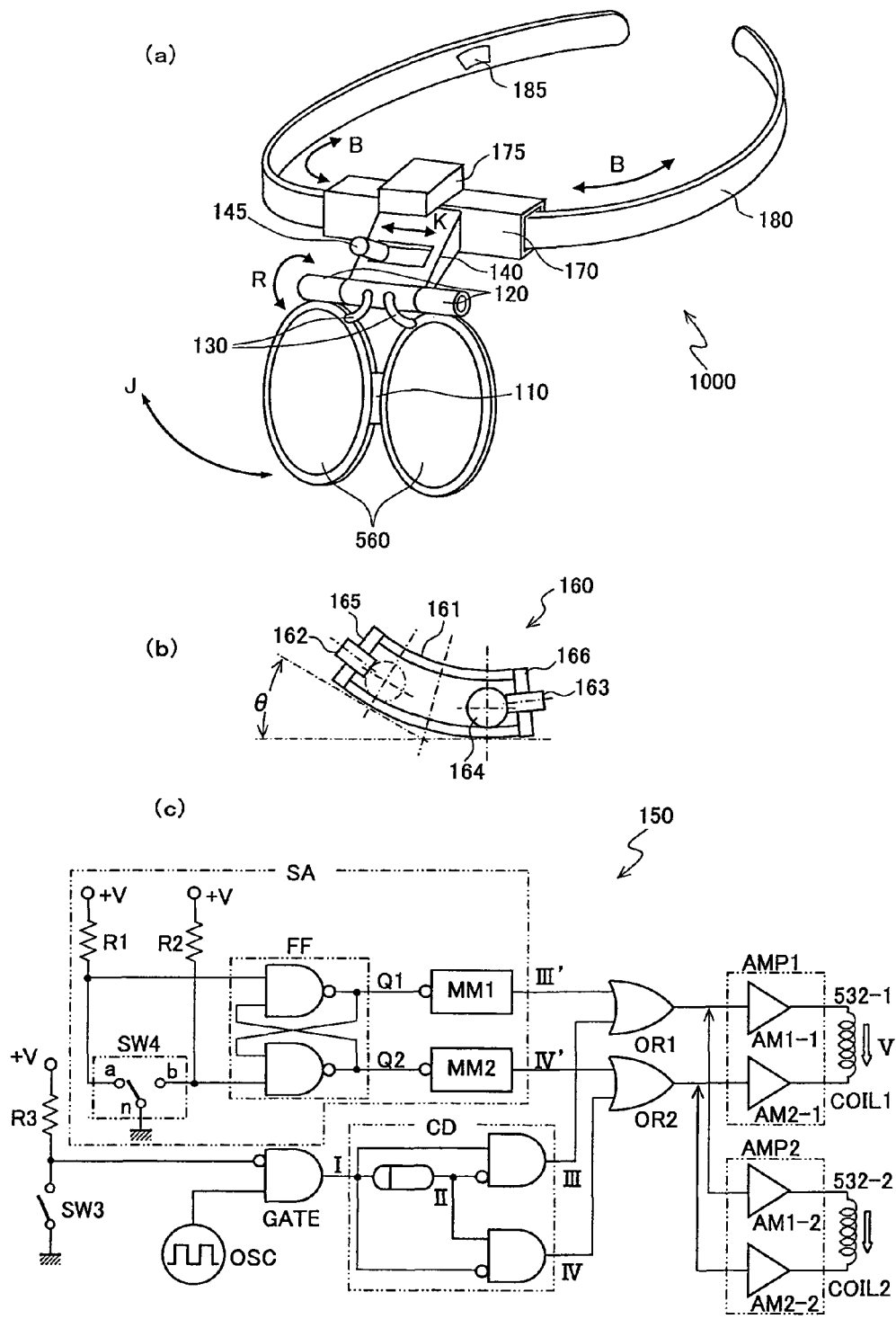
FIGS. 10(a) to 10(c) are diagrams depicting an example of application to a head-mounted loupe using bifocal lenses.
Figure 11:
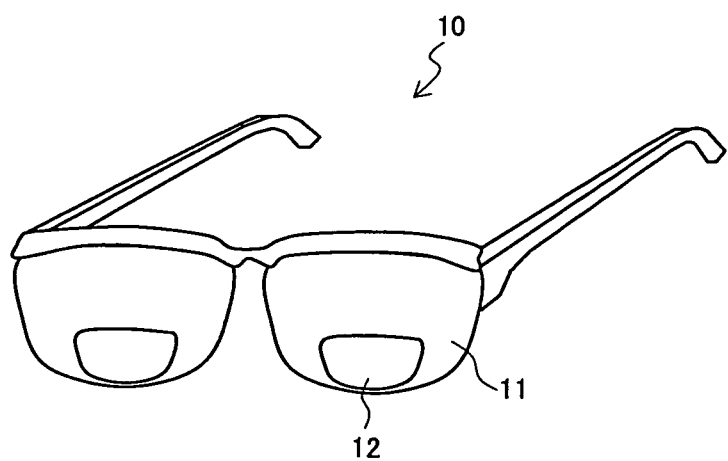
FIG. 11 is a diagram for explaining an embodiment of a conventional bifocal lens and bifocal glasses.

FIG. 10 depicts an embodiment of a head-mounted loupe using the bifocal lenses.

FIG. 10(a) is an external view of a head-mounted loupe 1000 made up of two of the bifocal lenses 560 depicted in FIG. 8 (the lens 500 of FIG. 7 or the lens 570 of FIG. 8 may also be available). The two bifocal lenses 560 are coupled to each other via a bridge 110 and are securely adhered to sleeves 120 as well. The two sleeves 120 are coupled via a support shaft (not shown) to each other, with a support 140 bearing the support shaft such that when a loupe wearer moves the bifocal lenses 560 as indicated by an arrow J, the bifocal lenses 560 turn as indicated by an arrow R. The interior of the support 140 receives, together with a battery acting as a power source, an electric circuit for driving an electromagnetic coil, with the output of an coil driving amplifier connecting to the drive coils 532 for the bifocal lenses 560 by lead wires extending through the interiors of electric wire protecting pipes (made of a flexible resin, etc). A semiautomatic-automatic changeover switch is adhered to the loupe and a knob 145 slides as indicated by an arrow K.

A posture detection switch 160 (not shown in this diagram) is fitted in a storage box 175. A body 170 is formed integrally with the support 140 and has a band 180 fastened thereto so as to enable its extension and withdrawal in the directions indicated by arrows B to adjust the length of the band. The band 180 has a spring property and is fitted with a power switch 185 that is turned on by a slight pressure applied to the wearer's head when mounted on the head.

When the user of such a head-mounted loupe applies the body 170 to his/her forehead and winds the band 180 around his/her head like a headband, the two bifocal lenses 560 come immediately in front of right and left eyes (even though the user wears other glasses at that time, the glasses and the bifocal lenses are together available with their lens surfaces superimposed). This mounting turns on the power switch 185.

Referring to FIG. 10(*b*), the structure of the posture detection switch 160 will be described.

A metal ball is received within the interior of a curved metallic pipe 161 so as to freely roll through the interior of the pipe. At the both ends of the pipe, terminals 162 and 163 made similarly of metal are supported by insulating covers 165 and 166. When the metal ball 164 lies at the right end with the left side of the pipe raised as shown in the diagram, this state is called a horizontal state in which the metal ball 164 comes into contact with the metallic terminal 162 so that the metallic pipe 161 and the terminal 162 become short-circuited. When the entirety is then tilted by an angle θ or more, the left end is relatively lowered so that the metal ball 164 rolls through the interior of the pipe 161 to move to the left end to come into contact with the terminal 163, consequently allowing the metallic pipe 161 and the terminal 163 to become short-circuited.

In other words, an electric switch is provided that turns on the terminal 162 and the pipe 161 with the horizontal state and that turns on the terminal 163 and the pipe 161 when the entire switching device tilts by the angle of θ or more.

The angle θ is set to be smaller than the angle of difference between the tilt angle of the head when the loupe wearer performs a dose-range activity with his/her head down and the tilt angle of the head when the loupe wearer faces straight ahead to look into the distance. The switch 160 is fitted in the storage box 175 such that the terminal 162 and the pipe 161 become short-circuited during the work but that the terminal 163 and the pipe 161 become short-circuited when looking into the distance.

FIG. 10(*c*) depicts an example of an electric circuit that drives the drive coil 531 of the head-mounted loupe. The detailed description of part overlapping with the description of FIG. 9 will be omitted. In FIG. 10(*c*), a posture detector SA detects a posture of the wearer's head and semiautomatically generates a pulse that goes high (H) for a certain time duration (td). Reference numeral SW4 denotes the posture detection switch 160, with the pipe 161, the terminal 162, and the terminal 163 corresponding respectively to terminal n, terminal a, and terminal b. FF denotes a flip flop including two NAND gates combined. MM1 and MM2 denote monomultivibrators each generating a pulse that goes to high (H) for a certain time duration (td) when the input changes from high (H) to low (L). The actions of the entire SA are such that an output III' outputs a pulse when the switch SW4 turns from the terminal a to the terminal b and that an output IV' outputs a pulse when turning from the terminal b to the terminal a. A switch SW3 is a switch for selecting whether to feed a pulse train generated by the oscillator OSC to the detector CD, the switch SW3 being configured such that when the switch SW3 is turned off or opened, the gate GATE is closed preventing the pulse train from the oscillator OSC from entering the detector CD. When the switch SW3 is turned on or closed, the gate GATE is opened to allow a rectangular wave pulse train generated from the oscillator OSC to enter the input I of the detector CD so that in the same manner as in FIG. 9(*a*), the output III outputs a pulse (pulse width td) when the input I changes from high (H) to low (L), whereas the output IV issues a pulse (pulse width td) when changing from low (L) to high (HL). An OR gate OR1 allows signals from both the outputs III' and III to pass therethrough as they are and an OR gate OR2 allows signals from both the outputs IV' and IV to pass therethrough as they are, for the delivery to the amplifiers AMP 1 and AMP2.

Afterward, in the same manner as in FIG. 9(*a*), COIL 1 (a drive coil 532-1) and COIL2 (ad drive coil 532-2) are energized. The drive coils 532-1 and 532-2 are represented applying the drive coil 532 of the separate bifocal lens 560 to both the left and right of the glasses. These actions are quite identical to the contents depicted in the timing chart of FIG. 9(*b*) (the power source and the power switch 185 are omitted in this diagram).

Although an object can continuously be observed if the oscillator has a frequency of several Hz or more, the user may perceive a change between the two states up to of the order of 20 Hz. If more, however, the user can use the glasses without being conscious of the change between the two states. Since the movie has a frame rate of 24 Hz, more than 24 Hz would be effective, but the television has a frame rate of 30 Hz and therefore it would not be desirable to be equal thereto. Here about 27 Hz (T≈37 milliseconds) intermediate therebetween will be employed for description.

<Description of Actions Upon Mounting Head-Mounted Loupe>

Actions of the loupe will be described for the semiautomatic mode and the full-automatic mode through a scene where the thus configured head-mounted loupe 1000 is mounted on the head and actually used by a user (a person having presbyopia who does not need glasses when watching the landscape or television but who needs glasses or a loupe when reading a book or a newspaper or doing some work nearby).

The semiautomatic mode is convenient, for example, to read the newspaper while watching television in a living room, etc.

When the user mounts the loupe on his/her head, the power switch 185 is turned on and the electric circuit 150 becomes ready to work. The user adjusts the direction of J so that the bifocal lenses 560 come immediately in front of his/her eyes, and then operates the switch knob 145 to turn off the switch SW3 (entering the semiautomatic mode). As a result, a pulse train generated from the oscillator OSC is blocked by the gate GATE so that no pulse appears from the outputs III and IV of the detector CD.

Since the user hangs his/her head somewhat down when reading the newspaper, the terminal 162 and the pipe 161 of the switch 160 are short-circuited via the metal ball 164. That is, since the switch SW4 is flipped onto the terminal a side, a pulse of time duration td is output from the output IV' of the posture detector SA so that outputs from the amplifiers AM2-1 and AM2-2 go high (H) with the outputs from the AM1-1 and AM1-2 remaining low (L), while a current opposite to the direction of the arrow is fed to COIL1 (the drive coil 532-1) and COIL2 (the drive coil 532-2) to thereby put the transparent elastic body 502 of the lens body 560 into the state 1, giving rise to a convex lens to enable the user to clearly read the characters or letters on the newspaper. When the user tries to look at the television screen in the process of reading or after finishing reading, the user raises his/her head to see the screen and the terminal 163 and the pipe 161 become short-circuited via the metal ball 164. That is, since the switch SW4 changes over from the terminal a side to the terminal b side, a pulse of time duration td is output from the output III' of the posture detector SA so that outputs from the amplifiers AM1-1 and AM1-2 go high (H) with the outputs from the AM2-1 and AM2-2 remaining low (L), while a current in the direction of the arrow is fed to COIL1 (the drive coil 532-1) and COIL2 (the drive coil 532-2) to thereby turn the transparent elastic body 502 of the lens body 560 from the state 1 to the state 2, giving rise to no lens effect to enable the user to clearly look at the television screen.

When the user takes up or operates an object lying at a some distant place (at a place 20 to 30 cm distant from the eyes) while doing a delicate work closely at hand (at a place of the order of 50 to 60 cm distant), there occurs a need for the user to look alternately at the object lying at a near place and the object lying at a far place, with the tilt angle of the head being small both upon seeing the near place and upon seeing the far place, and therefore the automatic mode will be convenient.

When the user mounts the loupe on his/her head, the power switch 185 is turned on and the electric circuit 150 becomes ready to work. The user adjusts the direction of J so that the bifocal lenses 560 come immediately in front of his/her eyes, and then operates the switch knob 145 to turn on the switch SW3 (entering the automatic mode). The gate GATE is then opened to allow a pulse train generated by the oscillator OSC to be fed through the input I to the detector CD so that the outputs III and IV output a pulse train as depicted in the timing chart of FIG. 9(b). At the same time, as depicting in the timing chart, COIL1 (the drive coil 532-1) and COIL2 (drive coil 532-2) are activated allowing the transparent elastic body to perform a repetitive action alternating the state 1 (s1) with the state 2 (s2). At this time, when the user looks at a nearby object, the object forms a blurred image at the timing of no lens effect in the state 2 (s2) but a clear image at the timing of a convex lens in the state 1 (s1) (human eyes become conscious of a clear image only while neglecting a blurred image).

That is, since the user can clearly capture an image of the object for about half the time, there is no hindrance to doing a work. Halfway, when the user tries to take up an object lying at a some distant place and turns his/her eyes thereto, the image of the object becomes blurred at the timing of a convex lens state in the state 1 (s1), but the object can clearly be seen at the no lens effect timing in the state 2 (s2). Similarly, the user can clearly capture an image of the object for about half the time, and hence when trying to take up an object, the user can catch the object without hindrance. In this manner, the user can see a nearby object and a some-distant object with their respective clear images without needing any troublesome works such as raising or lowering the lens portions of the loupe, thus leading to an improved work efficiency.

Thus, the semiautomatic use can reduce the opportunity to change over the focal length so that less current is fed to the drive coil to suppress the battery consumption, whereas the automatic use enables any objects to clearly be seen even when the displacement of the user's head is small due to a narrow range of disposition of the objects to be observed.

Although the embodiment in which the bifocal lenses are incorporated into a general-purpose loupe has hereinabove been described, a comfortable daily life level is ensured for the users by fabricating and wearing glasses suitable to the individual users' characteristics. Namely, to fabricate glasses, a lens most suitable to the respective eye characteristics has only to be selected from among the variations of the bifocal lens as depicted in FIG. 5. This enables applications not only to presbyopia but also to correction of nearsightedness and farsightedness.

Naturally, using such a bifocal lens to fabricate a loupe or glasses enables a single loupe or a single pair of glasses to deal with a situation as well where a user sees both a nearby object and a relatively distant object, the user being a person who was nearsighted in youth but has come to have presbyopia with age or a person who was farsighted in youth but thereafter has come to have presbyopia. For an astigmatic person, by subjecting the transparent substrate to an optical treatment for astigmatism (which is a known technique using an inverse function of the astigmatic characteristics), a single loupe or a single pair of glasses is available both when seeing a nearby object and when seeing a relatively distant object in the case as well where the person has come to have presbyopia.

EXPLANATIONS OF REFERENCE NUMERALS

100 . . . plate-like disc of rigid elastic body
200, 300, 500, 560 . . . bifocal lens
201, 301, 311, 311, 401, 501 . . . transparent substrate
302, 502 . . . transparent elastic body
203, 303, 503 . . . transparent liquid
310, 320, 330, 340 . . . bifocal lens
407, 408, 409 . . . transparent electrode
504 . . . rigid-elastic body
507 . . . spacer
512, 522 . . . rib
531 . . . permanent magnet
532 . . . electromagnetic coil
1000 . . . head-mounted loupe

The invention claimed is:

1. A bifocal lens comprising:
a transparent substrate having transparency and rigidity;
a transparent rigid-elastic body having transparency and elasticity, and whose periphery is sealed to the transparent substrate;
a transparent fluid confined only to an area between the transparent substrate and the transparent rigid-elastic body; and
a drive mechanism driven by an electrical circuit inducing a discrete change in shape of the transparent rigid-elastic body,
wherein the transparent rigid-elastic body has a portion having two stable shapes which are convex and concave, and
wherein the drive mechanism is for changing shape of the portion from the convex shape to the concave shape or vice versa.

2. A bifocal lens comprising:
a transparent substrate having transparency and rigidity;
a transparent rigid-elastic body having transparency and elasticity, and whose periphery is sealed to the transparent substrate;
a transparent fluid confined only to an area between the transparent substrate and the transparent rigid-elastic body; and
a drive mechanism driven by an electrical circuit periodically inducing a discrete change in shape of the transparent rigid-elastic body,
wherein the transparent rigid-elastic body has a portion having two stable shapes which are convex and concave, and
wherein the drive mechanism is for periodically changing shape of the portion from the convex shape to the concave shape or vice versa alternately.

3. Bifocal glasses comprising a bifocal lens as defined in claim 1.

4. Bifocal glasses comprising a bifocal lens as defined in claim 2.

5. The bifocal lens of claim 1, wherein an entirety of the periphery of the transparent rigid-elastic body is sealed to the transparent substrate confining the transparent fluid to the area between the transparent substrate and the transparent rigid-elastic body, and wherein the drive mechanism changes shape of said portion without altering amount of the confined transparent fluid.

6. The bifocal lens of claim 2, wherein an entirety of the periphery of the transparent rigid-elastic body is sealed to the transparent substrate confining the transparent fluid to the area between the transparent substrate and the transparent rigid-elastic body, and wherein the drive mechanism changes shape of said portion without altering amount of the confined transparent fluid.

7. The bifocal lens of claim 1, wherein the drive mechanism comprises a coil responsive to an electric signal of said electrical circuit.

8. The bifocal lens of claim 2, wherein the drive mechanism comprises a coil responsive to an electric signal of said electrical circuit.

9. A bifocal lens comprising: a transparent substrate having transparency and rigidity;
- a transparent rigid-elastic body having transparency and elasticity, and whose periphery is sealed to the transparent substrate;
- a transparent fluid confined only to an area between the transparent substrate and the transparent rigid-elastic body; and
- a drive mechanism comprising a conductor, the drive mechanism being configured to respond to an electrical signal conducted through the conductor to cause a discrete change in the shape of the transparent rigid-elastic body,
- wherein the transparent rigid-elastic body has a portion having two stable shapes which are convex and concave, and
- wherein the drive mechanism is for changing shape of the portion from the convex shape to the concave shape or vice versa.

10. The bifocal lens of claim 1, wherein the drive mechanism is configured to respond to said electrical signal conducted through the conductor to cause the change in the shape of the transparent rigid-elastic body, and is not configured to cause a change in shape of the substrate, and wherein the substrate is configured to maintain an unchanged shape.

11. The bifocal lens of claim 2, wherein the drive mechanism is configured to respond to said electrical signal conducted through the conductor to cause the change in the shape of the transparent rigid-elastic body, and is not configured to cause a change in shape of the substrate, and wherein the substrate is configured to maintain an unchanged shape.

* * * * *